(12) United States Patent
Papalia

(10) Patent No.: US 9,574,811 B2
(45) Date of Patent: Feb. 21, 2017

(54) TRANSPARENT ICE MAKER

(71) Applicant: Rocco Papalia, San Francisco, CA (US)

(72) Inventor: Rocco Papalia, San Francisco, CA (US)

( * ) Notice: Subject to any disclaimer, the term of this patent is extended or adjusted under 35 U.S.C. 154(b) by 421 days.

(21) Appl. No.: 14/098,046

(22) Filed: Dec. 5, 2013

(65) Prior Publication Data

US 2015/0107275 A1   Apr. 23, 2015

Related U.S. Application Data

(60) Provisional application No. 61/892,679, filed on Oct. 18, 2013.

(51) Int. Cl.
*F25C 1/18* (2006.01)

(52) U.S. Cl.
CPC ............ *F25C 1/18* (2013.01); *F25C 2500/02* (2013.01); *Y02P 60/855* (2015.11)

(58) Field of Classification Search
CPC .......... F25C 1/18; F25C 1/24; F25C 2500/02; F25C 1/08
See application file for complete search history.

(56) References Cited

U.S. PATENT DOCUMENTS

| | | |
|---|---|---|
| 3,321,932 A | 5/1967 | Orphey |
| 3,952,539 A | 4/1976 | Hanson et al. |
| 5,364,063 A * | 11/1994 | Nishimura ............... F25C 1/243 249/119 |
| 6,357,720 B1 * | 3/2002 | Shapiro ..................... F25C 1/10 249/119 |
| 8,459,047 B2 | 6/2013 | Hall et al. |
| 2009/0152438 A1 * | 6/2009 | Chu .......................... F25C 1/24 249/83 |

\* cited by examiner

*Primary Examiner* — Elizabeth Martin
(74) *Attorney, Agent, or Firm* — Scott L. Harper; Griffith Bates Champion & Harper LLP

(57) ABSTRACT

An apparatus and method for producing substantially clear ice in a variety of desired shapes. The apparatus and method in the described embodiments generally provide for an insulated ice mold containing one or more mold cells, each mold cell with an open top, open bottom, and insulated side walls, that is suspended over a liquid water reservoir surrounded and contained in an insulated container. The top surface of the water residing in each mold cell is exposed to freezing air. The insulated walls forming the sides of one or more mold cells act to insure that each ice shape forms and grows from the top surface, down and towards the bottom of each mold cell. The liquid water reservoir, which contacts the bottom surface of the ice shape, remains in a liquid phase and serves as an impurity sink into which the impurities and gases contained in the freezing water are driven as ice forms downward in the mold cell. The liquid water reservoir acts to arrest ice growth below the bottom of the mold cell, while the water in the mold cells freezes into a solid above the ice-water interface.

5 Claims, 4 Drawing Sheets

TRANSPARENT ICE MAKER

CROSS-REFERENCE TO RELATED APPLICATIONS

This application claims the benefit of and priority to U.S. provisional patent application, Ser. No. 61/892,679, filed on Oct. 18, 2013 with the United States Patent & Trademark Office the complete disclosure of which is incorporated herein by reference.

BACKGROUND OF THE INVENTION

The present invention relates generally to an improved apparatus and method for making clear or transparent ice, and more specifically, to an apparatus and method for making clear or transparent ice in a variety of geometric shapes and which can be implemented in commonly available refrigeration/freezer equipment.

Typical household and commercial refrigeration systems include separate refrigerator and freezing compartments. Ice cubes may be formed manually or automatically in various conventionally known manners utilizing the freezing compartment of such refrigeration and freezing equipment. As is commonly known, making ice typically involves filling a tray with individual cube molds, either fixed to or formed as part of an ice tray, with water and placing the ice tray in a freezer compartment having an ambient air temperature below 32° F. The water in the tray begins to freeze and solidify from all sides and surfaces (including the top water surface which is directly exposed to the freezing air) then in and through the remaining volume of water occupying the cube mold since the exterior peripheral cube surfaces freeze first. Impurities and gases contained within the water to be frozen are trapped in the solidified ice cube during the freezing process, commonly near the center and/or the bottom surface of the ice cube, due to their inability to escape as a result of the freezing liquid to solid phase change of the ice cube surfaces. Once the water in the tray is frozen solid, the ice tray is removed from the freezer compartment and each individual ice cube formed in the tray is removed from the individual cube molds and either placed in a beverage to cool the temperature of the beverage or placed in a storage bin in the freezer compartment for later use.

As highlighted above, such known ice cube formation apparatus and methods produce opaque or "clouded" ice cubes which result from the entrapment of suspended and dissolved solids, liquids and gases that become trapped within the frozen ice cube during the freezing process. The opaque appearance of the ice cubes is generally aesthetically displeasing. Likewise, suspended and dissolved impurities that are entrapped in the frozen ice cube are released into the beverage or foodstuff being cooled by the ice cube as the ice cube melts. Moreover, the frozen structure of these impurities maximizes the interstitial surface area of the ice cube thereby increasing the melt rate of the ice cube and further watering down the beverage being cooled by the ice cube.

Commercially available clear icemakers are known in the art that require complex mechanical and thermodynamic processes to form clear ice. For example, the apparatus disclosed in U.S. Pat. No. 3,952,539, requires the use of metal inserts with heating elements to prevent freezing of the ice cube at the bottom of each ice grid cavity to enable the production of clear ice cubes and their removal from the tray. The clear ice tray disclosed in U.S. Pat. No. 6,357,720 requires the use of an ice mold with sidewalls and a closed mold bottom that must be air permeable for venting air bubbles that are produced in the water during the formation of solid ice cubes. The method and apparatus disclosed in U.S. Pat. No. 6,357,720 is also limited in its ability to produce clear ice cubes in that the gases vented during the freezing process must be diffused through the permeable sidewalls and the mold bottom at a faster rate than the liquid-to-solid phase change rate occurring in the ice mold. However, the suspended and dissolved solids and liquids in the water freezing in the molds are not removed or liberated and remain in the resulting ice cubes. Another drawback of these known apparatii and methods for producing clear ice concerns their requirement of electro-mechanical energy inputs and assemblies, and/or specific construction materials (e.g. air permeable) that may only be formed and produced using technical construction methods and equipment in order to function and produce clear ice. Moreover, they fail to produce a clear ice product as they are generally focused and drawn to the removal of a specific contaminant, such as gas bubbles or suspended solids, versus the removal of the combination of suspended and dissolved liquids, solids and gases which exist in unfrozen water and prevent the formation of clear ice.

Accordingly, there is a need in the art for an apparatus and method for making clear or transparent ice that acts to substantially reduce or eliminate the entrapment of solids and gases during the production of ice cubes. There is a need in the art for a simple, inexpensive apparatus and method for producing clear or transparent ice which does not require the use or purchase of complex mechanical/electro-mechanical equipment and processes, and which may be implemented using conventional and readily available refrigeration and/or freezing appliances and materials. There is a need in the art for an easily configurable apparatus and method allowing for the production of a variety of ice shapes that do not require intensive equipment modification or labor for implementation and production.

BRIEF SUMMARY OF THE INVENTION

According to one aspect, the present invention provides an apparatus comprising an insulated ice mold form containing one or more mold cells, each mold cell with an open top, open bottom, and formed insulated side walls that is suspended over a liquid water reservoir surrounded and contained in an insulated container. The top water surface of the water residing in each mold cell is exposed to freezing air. The insulated walls forming the sides of one or more mold cells act to insure that each ice shape forms and grows from the top surface of the ice shape forming within each mold cell, which is in contact with freezing air, down and towards the bottom of each mold cell during the freezing process. The liquid water reservoir, which contacts the bottom surface of the ice shape suspended in a mold cell terminating substantially at or near the ice-water reservoir contact level or interface, serves as an impurity sink into which the impurities and gases contained in the freezing water contained in each mold cell are driven as ice crystals form and ice growth occurs in each cell in a vertical downward direction. Likewise, the liquid water reservoir acts as a heat sink to resist freezing, while the ice shapes in the mold cells are freezing into a solid phase above the ice-reservoir water interface during the ice shape formation process. By leveraging the thermodynamic cooling properties in part resulting from the larger surface area to volume (SA/V) ratio of the individual mold shapes which are in fluid connection with the lower SA/V ratio of the liquid water reservoir the water reservoir remains available in liquid phase for an extended period of time to receive additional impurities and gases as the water in each mold cell transitions into a solid ice shape during the freezing process. The liquid water reservoir acts to substantially arrest additional solid ice shape growth beyond the bottom of the mold cell at or near the ice-water reservoir interface due to the high specific heat property associated with liquid water (the specific heat of water is 1 calorie/gram ° C.), and the substantially reduced surface area to volume ratio between the solid ice shape forming or formed in each mold shape and the liquid water reservoir.

Once the ice shape has grown to the desired dimension, which generally correlates to the vertical length or depth of the mold cells at or near the ice-water reservoir interface, the ice mold, with ice shapes contained in the one or more mold cells, is easily removed from the insulated container as the presence of the ice-liquid water reservoir interface provides a natural physical separation point between the ice shapes and liquid water reservoir. There is no need for mechanical cutting or thermoelectric separation equipment to separate the ice mold form from the insulated container. The frozen clear ice shapes may then be easily ejected by hand from the individual mold cells and immediately used for cooling purposes or placed in a freezer for storage. The ice mold form may then be replaced in the insulated container, re-filled with liquid water, and replaced in the freezer compartment for the production of additional clear ice.

According to another embodiment, the present invention provides an apparatus and method for forming clear or transparent ice in a variety of geometric shapes. The insulated ice mold form may be constructed and formed as a single-piece so as to yield clear or transparent ice in cubic, conical, square, spherical, hemi-spherical or other ice shapes as desired. In one embodiment, the insulated single-piece ice mold form is constructed in a cylindrical shape with a hemi-spherical bottom that minimizes surface area to volume (S/V) ratio for an extractable shape from the single-piece ice mold producing clear ice in the contemplated embodiment.

According to another embodiment, the present invention provides an apparatus and method for forming clear or transparent ice comprising an insert tray with one or more cells formed within the interior region of the insert tray. The insert tray is placed into and surrounded by an insulating jacket both of which are then inserted into an insulated container containing the liquid water reservoir. The insulating jacket surrounds and is in physical contact with the exterior sidewalls of the insert tray and acts to promote the formation of clear or transparent ice shapes within the cell or cells of the insert tray as later described herein. The insert tray may be constructed and formed of one or more pieces and shaped to produce a variety of clear or transparent ice in cubic, conical, square, hemi-spherical or other ice shapes as desired.

According to another embodiment, the present invention provides a multi-piece ice mold constructed and formed so as to yield clear or transparent ice in a spherical shape as desired. In one embodiment, the multi-piece ice mold is constructed from two corresponding hemispherical molds with an opening located at the pole of each hemisphere mold. The multi-piece ice mold is secured together, placed into a cell of an insert tray and surrounded by an insulating jacket, and inserted into an insulated container containing the liquid water reservoir that is then filled with water and placed in a freezing air environment according to the apparatus and methods disclosed herein. After freezing of the spherical ice shape occurs in the interior of the ice mold, the ice mold is removed from the insulated mold form, insert tray and/or insulated container and the resulting substantially spherical ice shape extracted by separating the multi-piece ice mold components.

In this respect, before explaining the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
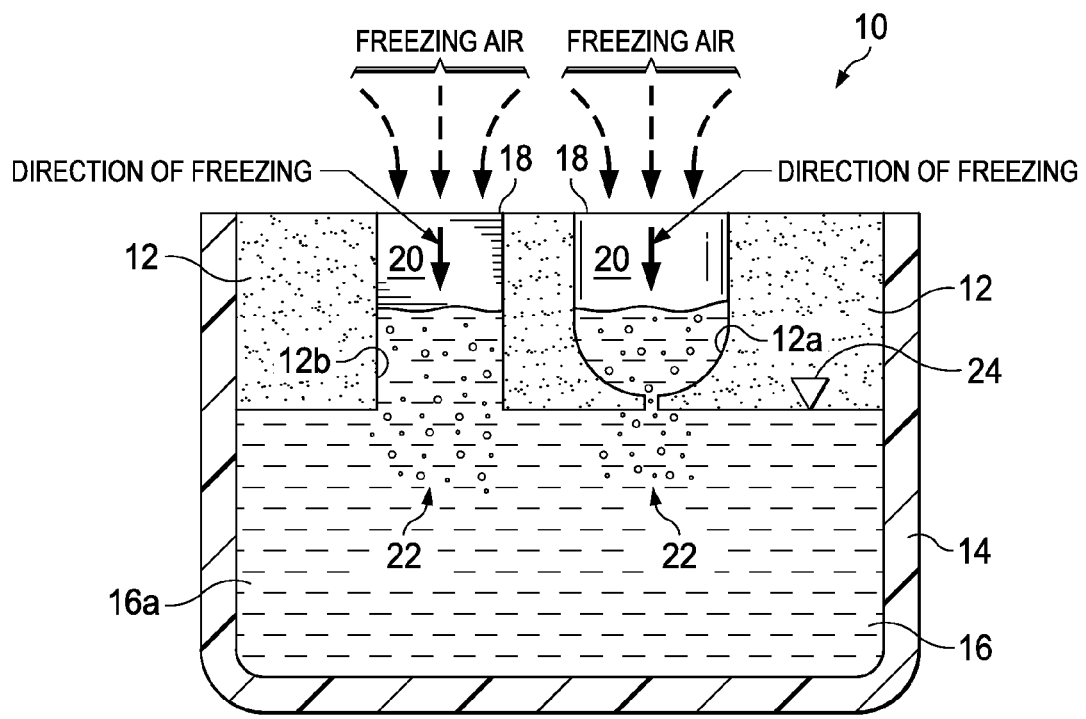
FIG. 1 is a side elevational view depicting an exemplary embodiment of the icemaker apparatus and method for producing substantially clear ice shapes in accordance with the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Without being bound by theory, the inventive apparatus and method described herein provide for the production of substantially clear, if not transparent, ice shapes by taking advantage of the thermodynamic differential in the rate of heat loss resulting from different SA/V ratios between an ice mold shape and a liquid water reservoir as described in detail below. Generally, an object or shape gains or loses heat through its surface area, so the larger the surface area of the object or shape the faster the associated rate of heat loss or heat gain. Likewise, an object or shape with a smaller surface area will experience a slower associated rate of heat loss or heat gain. The amount of heat stored and the rate at which the heat is lost in a particular object or shape is greatly affected by its volume. An object or shape with a larger SA/V ratio (i.e., a large surface area compared to its volume) will lose heat more quickly, while an object or shape with a smaller SA/V ratio (small surface area compared to its volume) will lose heat more slowly. Taking advantage of the thermodynamic properties associated with heat transfer related to differences in SA/V ratios, the production of substantially clear, if not transparent, ice shapes by the inventive apparatus and method described herein is provided without the need for external energy inputs or complex mechanical systems.

Turning to FIG. 1, an embodiment of an icemaker apparatus (10) for making substantially transparent or clear ice shapes with conventional freezing systems is shown. An insulated single-piece ice mold (12) is shown suspended within an insulated container (14). Insulated container (14) creates a reservoir to contain liquid water (16) poured into insulated container (14) and ice mold (12) as described hereafter. Ice mold (12) includes preconfigured cells (12a), (12b) defined by sidewalls that may be of a variety of geometric shapes that are precut and removed from the insulating material forming the insulated ice mold (12) in the desired shape and/or configuration. In the depicted embodiment, cell (12a) acts to form a cylindrical ice shape with a hemispherical end and cell (12b) acts to form a cubic ice shape. Any size and design of shaped clear ice (20) is easily manufactured with the disclosed inventive apparatus and method. It is desirable that ice mold (12) be constructed of known insulating materials which are preferably waterproof or otherwise substantially resistant and impermeable to water penetrating and flowing through the interstices of the insulation material. The ice mold (12) may be constructed from silicone, polyurethane foam, beaded polystyrene (BPS) foam, or expanded polystyrene (EPS) foam among other known suitable materials which exhibit low or reduced thermal conductivity properties as desired for purposes of effectuating the invention as described below.

FIG. 1 demonstrates the process by which substantially transparent ice is formed by the present inventive method. As previously described, insulated ice mold (12) is secured within insulated container (14) as shown. Insulated container (14) is filled with water (16) substantially below, level with or above the top surface (18) of insulated ice mold (12). Water (16) may be introduced into insulated container (14) and insulated ice mold (12) either before or after insulated ice mold (12) is secured within the insulated container (14). The icemaker (10) is then placed in a freezing air environment such as that found and produced in typical residential and commercial freezer appliances. Freezing air is circulated around icemaker (10) including above the top surface (18) of the insulated ice mold (12) that begins to cool the temperature of the water (16) in cells (12a), (12b) at the top surface (18). Due to the reduced thermal conductivity properties of insulated sidewalls of ice mold (12), the water begins freezing from the top surface (18) of each cell (12a), (12b) thereby forming ice shapes (20) in each cell (12a), (12b) of the ice mold (12) with water (16) continuing to freeze in the downward direction toward water reservoir (16a). In this way, directional formation and solidification of ice shapes (20) from the top of cells (12a), (12b) vertically down towards the water reservoir (16a) is promoted so that impurities (22), such as suspended and dissolved solids, liquids and dissolved gases, are driven toward the water reservoir (16a) ahead of the forming ice crystal structure as ice shapes (20) are formed. To facilitate this process, water (16) in water reservoir (16a) acts as an impurity sink into which impurities (22) are pushed into the unfrozen pool of water (16) contained in water reservoir (16a).

As the water continues to freeze in cells (12a), (12b) in the vertical downward direction indicated on FIG. 1, the rate of freezing begins to decrease near or at the ice-water reservoir contact level (24) located generally near or at the point of contact between the bottom surface of ice mold (12) and water reservoir (16a) substantially arresting additional ice shape (20) growth beyond the ice cells (12a), (12b) at the ice-water reservoir contact level (24). This unique feature of the invention provides for easy extraction of the insulated ice mold (12) from the insulated container (14), while retaining the displaced impurities (22) in the water reservoir remaining in the insulating container (14). The user may then simply extract ice shapes (20) from the cells (12a), (12b) by pushing the solidified shapes out of the cells (12a), (12b) and use them to cool a beverage or place them in a container for storage in a freezer appliance.

Figure 2:
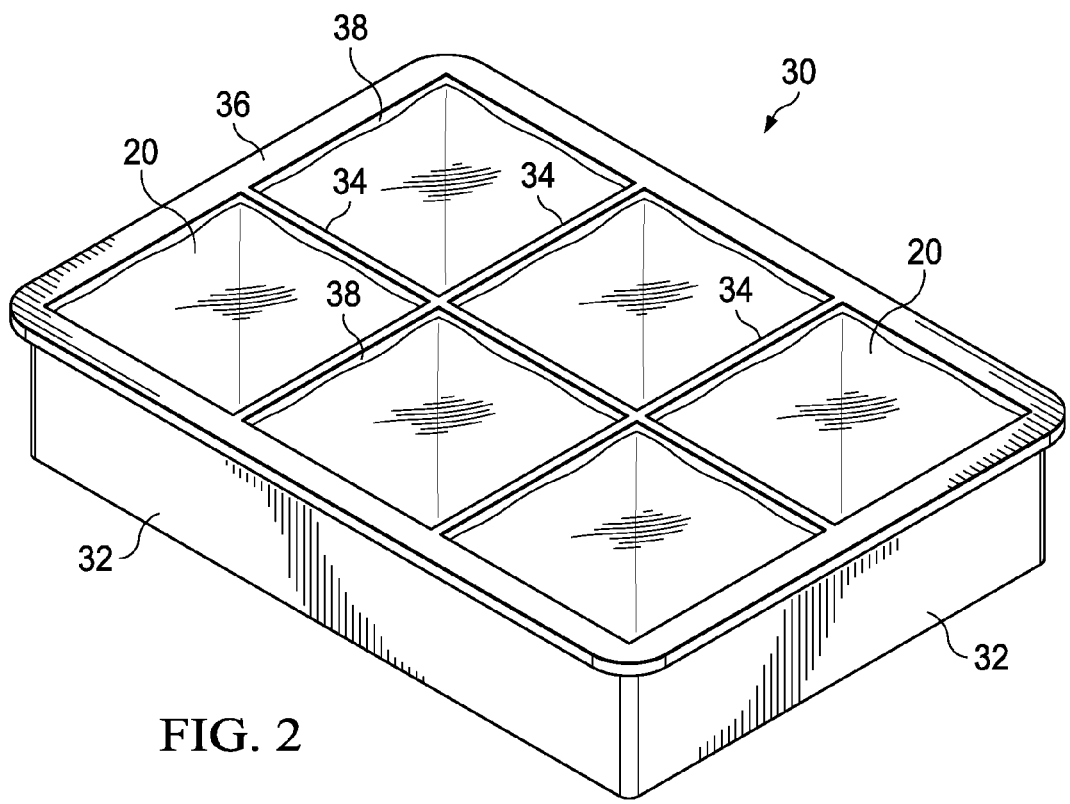
FIG. 2 is a perspective view of an exemplary embodiment of an insert tray with one or more ice molds for producing multiple clear ice shapes in accordance with the present invention.

FIG. 2 depicts an embodiment of the invention disclosed herein featuring an insert tray (30) which may used to form shaped ice according to the method as disclosed herein. Insert tray (30) is formed with exterior sidewalls (32) and interior divider walls (34) that act to form cells (38). Tray ledge (36) is formed on top of exterior sidewalls (32) to act as a support for insert tray (30) when insert tray (30) is positioned in insulating jacket (40) as later described and shown in FIG. 3. Insert tray (30) may be fashioned from rigid or semi-rigid materials that exhibit reduced or low thermal conductivity so as to promote ice formation in the vertical direction as previously described herein. In one embodiment, insert tray (30) is formed from flexible silicone, rubber or other thermoplastic materials as known in the art. Cells (38) may be formed so as to provide a variety of ice shapes, including but not limited to, cubic, rectangular, spiral, spherical, hemi-spherical and cylindrical ice shapes as desired by the user. The cubic shape cell form generally shown in FIG. 2 is not to be construed as limiting the myriad shaped insert tray or cell forms that could produce a variety of ice shapes using the teachings disclosed herein.

Figure 3:
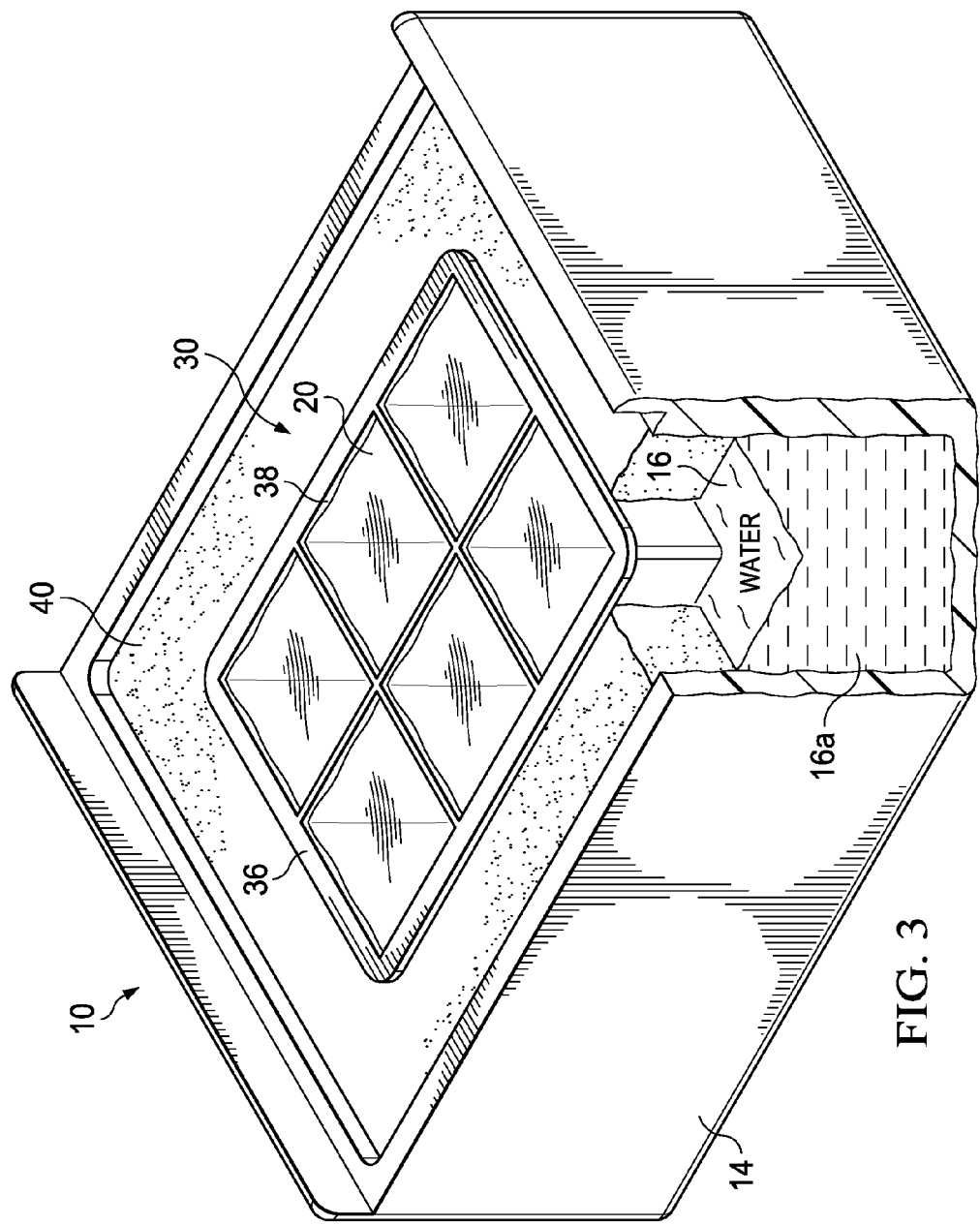
FIG. 3 is a perspective sectional view of an exemplary embodiment of the icemaker apparatus including the insert tray insert surrounded by an insulating jacket and placed in an insulated container for producing multiple clear ice shapes in accordance with the present invention.

With regard to FIG. 3, an embodiment of the clear icemaker (10) invention is shown. Icemaker (10) includes insulating container (14), insert tray (30) and insulating jacket (40) arranged as shown. Insert tray (30) is substantially surrounded by insulating jacket (40) that in turn is surrounded by insulating container (14). Insert tray (30), insulating jacket (40) and insulating container (14) are dimensioned so as to provide a snug, compressive fitment when positioned as shown and operable to support insert tray (30) above liquid water reservoir (16a) as previously described. Tray ledge (36) acts to lend additional structural support to insert tray (30) by overlapping and resting on the top surface of insulating jacket (40). Insulating jacket (40) also acts to substantially reduce the thermal conductivity of exterior ice tray cell sidewalls (32) thereby encouraging the formation of ice from the top surface of ice tray cells (38) vertically downward towards water reservoir (16a), while substantially reducing and/or inhibiting lateral freezing from the transfer of heat through exterior sidewalls (32) of insert tray (30). It is desirable that insulating jacket (40) be constructed of known thermal insulating or low thermal conductivity materials which are preferably waterproof or otherwise substantially resistant and impermeable to water penetrating and flowing through the interstices of insulating jacket (40) material. Insulating jacket (40) may be constructed from silicone, plastic, thermoplastic, polyethylene, polypropylene, polyurethane foam, beaded polystyrene (BPS) foam, expanded polystyrene foam polyurethane (EPS) foam, or from other known suitable materials which exhibit low or reduced thermal conductivity properties as desired for purposes of effectuating the invention.

In similar fashion to the ice shape formation process described herein and depicted in FIG. 1, water begins freezing from the top surface of each cell (38) formed in insert tray (30) thereby forming ice shapes (20) in each mold cell (38) contained in insert tray (30). The water in each cell (38) continues to freeze in a substantially vertical, downward direction toward water reservoir (16a) due to the reduced thermal conductivity provided by the insulating jacket (40) surrounding external sidewalls (32) of insert tray (30), in turn causing the heat from the freezing water in ice tray cells (38) to rise substantially vertically and be transferred into the freezing air circulating above the top surface of the mold cell (38). In this way, directional formation and solidification of ice shapes (20) from the top of each mold cell (38) vertically down towards the water reservoir (16a) is promoted so that impurities, such as suspended and dissolved solids, liquids and gases, are driven toward the water reservoir (16a) ahead of the forming ice crystal structure as ice shapes (20) are formed. Thus, water reservoir (16a) acts as an impurity sink into which impurities (22) are pushed into the unfrozen pool of water (16) contained in water reservoir (16a) as described in FIG. 1.

As the water continues to freeze in the vertical downward direction indicated on FIG. 1, the rate of freezing begins to decrease near or at the ice-water reservoir contact level (24) located generally at the contact point between the bottom of sidewall (32) and divider wall (34) edges of insert tray (30) and water reservoir (16a) substantially arresting additional ice shape (20) growth beyond the bottom sidewall (32) edges and bottom of interior divider wall (34) edges at or near ice-water reservoir contact level (24). The rate of freezing substantially decreases at or near the ice-water reservoir contact level (24) due to the combination of the sudden decrease in SA/V ratio between the water in individual ice molds (38) and in water reservoir (16a) resulting in a reduction of the heat transfer rate from water in the ice molds (38) to water (16) in liquid water reservoir (16a), and the insulated sidewalls of the insulating container (14) which act to retard the flow of heat out of liquid water (16) contained in water reservoir (16a). As a result, the time required for the water (16) in water reservoir (16a) to freeze is substantially extended which allows for the formation of solid ice shapes (20) to be easily separated from the water reservoir (16a) at or near the ice-water reservoir contact level (24). These unique features of the invention provide for easy extraction of insert tray (30) and/or insulating jacket (40) from insulated container (14), while retaining the displaced impurities (22) in water (16) in water reservoir (16a) remaining in insulating container (14). The user may then simply remove insert tray (30) from insulating jacket (40) and extract ice shapes (20) from insert tray (30) by pushing solidified ice shapes (20) out of insert tray cells (38) and use them to cool a beverage or place them in a container for storage in a freezer appliance.

Figure 4:
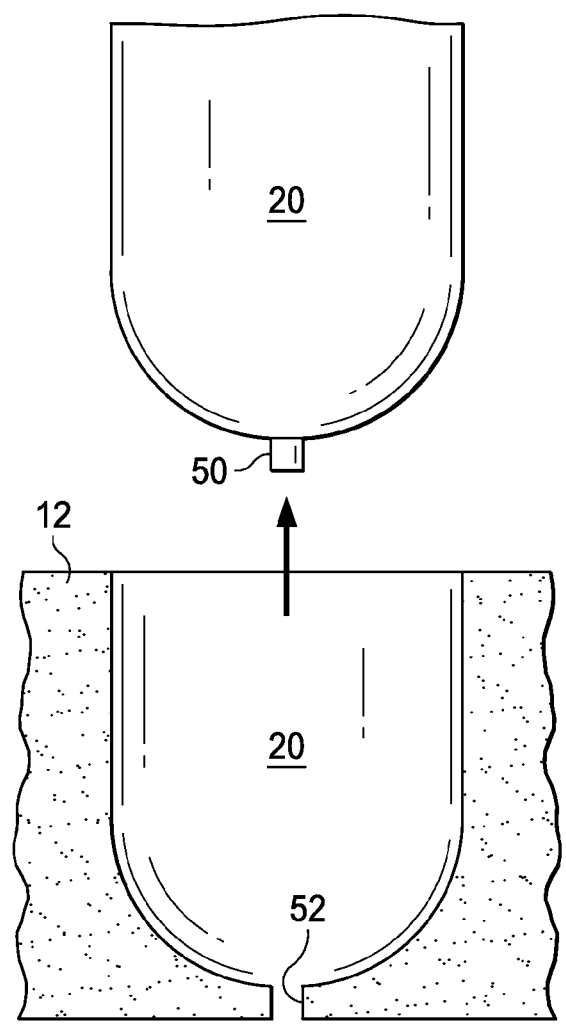
FIG. 4 is a side elevational view of an exemplary embodiment of a cylindrical clear ice shape with a hemispherical end being removed from a corresponding ice mold for producing a cylindrical clear ice shape with a hemispherical end in accordance with the present invention.

FIG. 4 depicts an insulated single-piece ice mold (12) for producing a cylindrical clear ice shape with a hemispherical end or "bullet" ice shape (20) in accordance with an embodiment of the present invention. Single-piece ice mold (12) is constructed in a cylindrical shape with a hemi-spherical end that minimizes the SA/V ratio for an extractable shape from the single-piece mold (12) resulting in the production of substantially clear ice. Due to the mold structure required to produce a bullet shape, bullet ice shape (20) will likely include an ice protrusion (50) formed at the tip of the hemispherical end due to orifice (52) which provides a pathway for drawing heat and impurities out of the water freezing in single-piece ice mold (12) and into water (16) in water reservoir (16a) by the clear ice formation method as previously described. Upon extraction of bullet ice shape (20) from single-piece ice mold (12), the user may simply shave or file down ice protrusion (50) to remove it from bullet ice shape (50) for aesthetic purposes.

Figure 5A:
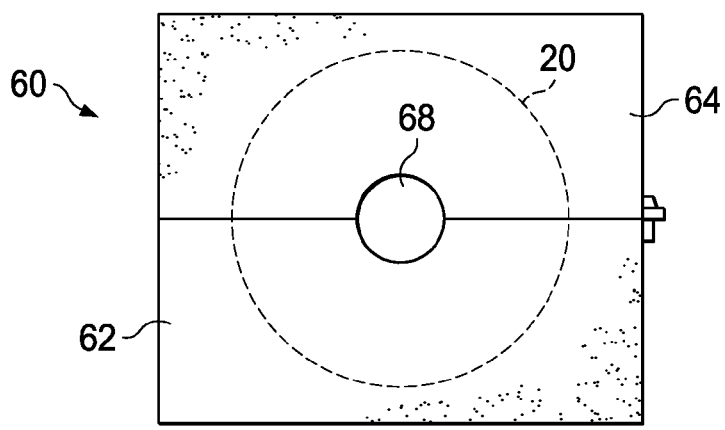
FIG. 5A is a side elevational view of an exemplary embodiment of an ice mold in a closed position for producing a spherical clear ice shape in accordance with the present invention; and, FIG. 5B is a perspective view of an exemplary embodiment of a spherical clear ice shape being removed from a corresponding ice mold for producing a spherical clear ice shape in accordance with the present invention.
Figure 5B:
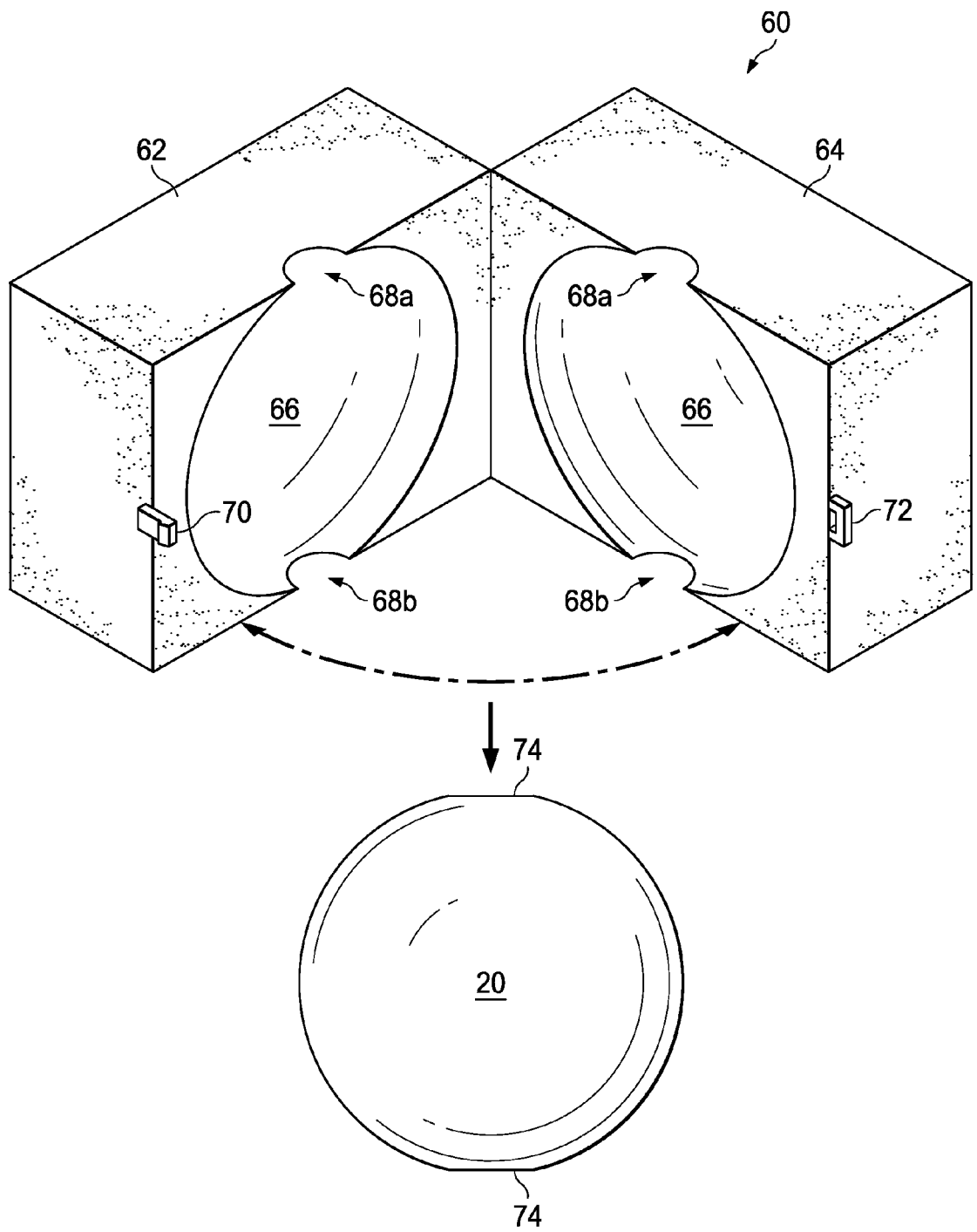

An embodiment for producing substantially spherical or other complex ice shapes according to the invention described herein is depicted in FIGS. 5A and 5B. FIG. 5A depicts an insulated spherical multi-piece ice mold (60) that includes a first mold (62) and a second mold (64) hingedly connected together as shown. First mold (62) and second mold (64) each include a hollow hemispherical shape fashioned therein such that when the first mold (62) and second mold (64) are mated together, a spherical shape is formed in the interior of spherical multi-piece ice mold form (60).

Turning to FIG. 5B, orifices (68a), (68b) are formed at the opposite sides of the spherical multi-piece ice mold (60) resulting from positioning substantially semi-circular openings formed on the opposing sides of first mold (62) and second mold (64) as shown. Orifices (68a), (68b) provide for filling the assembled multi-piece ice mold (60) with water, allowing for freezing air to contact the water in spherical multi-piece ice mold (60) via orifice (68a) during the freezing process, and for impurities and heat to be transferred to the water in the water reservoir and out of the spherical multi-piece ice mold (60) via orifice (68b) when the spherical multi-piece ice mold (60) is in use according to the invention disclosed herein. Orifices (68a), (68b) need not be circular in shape and other orifice shapes would accomplish the purposes of the contemplated invention. For purposes of mating first mold (62) and second mold (64) to form a spherical ice shape, a tab (70) is formed or otherwise connected to first mold (62) and a latch (72) is formed or otherwise connected to second mold (64) providing for releasably securing first mold (62) and second mold (64) together to form spherical multi-piece ice mold (60). In one embodiment, spherical multi-piece ice mold (60) is dimensioned and adapted to be releasably secured and positioned into one or more cells of ice tray (30) depicted in FIG. 3.

Returning to FIG. 5B and in order to produce substantially clear spherical ice shapes, the user may simply mate first mold (62) to second mold (64) (with the latch and tab mechanism described above or by other attachment means as known in the art) and place the spherical multi-piece ice mold (60) or multiple spherical molds multi-piece ice molds (60) into insert tray (30) which is substantially surrounded by insulating jacket (40) and both of which are placed into insulating container (14) as shown in FIG. 3. The icemaker (10) is then filled with water sufficient to submerge spherical multi-piece ice mold (60) and placed in a freezing air environment. The water in spherical multi-piece ice mold (60) begins to freeze from the top of the mold due to freezing air contacting the water in multi-piece ice mold (60) via orifice (68a) which continues to freeze in a downward vertical direction until the water contained in spherical multi-piece ice mold (60) is frozen. During the freezing process, impurities are driven and heat transferred into the liquid water (16) in water reservoir (16*a*) below the bottom surface of spherical multi-piece ice mold (60) via bottom orifice (68*b*). As previously described, due to the decrease in SA/V ratio of liquid water residing in the water reservoir (16*a*) which is in contact with the bottom of the spherical multi-piece ice mold (60) at ice-water reservoir contact level (24), such decrease in the SA/V ratio acts to substantially reduce the rate of heat transfer from the water in freezing spherical multi-piece ice mold (60) to water (16) in water reservoir (16*a*) thereby substantially arresting additional ice growth beyond the ice-water reservoir contact level (24).

Once the water contained within spherical multi-piece ice mold (60) has frozen solid, the user may simply remove the insert tray and/or insulating jacket from the insulating container and remove spherical multi-piece ice mold (60) from the insert tray. The user then separates first mold (62) from second mold (64) as shown thereby releasing spherical ice shape (20). Spherical multi-piece ice mold (60) may then be washed and reused to produce additional substantially clear spherical ice shapes according to the invention disclosed herein. It is contemplated that alternative ice shapes such as a hemisphere shapes, cube shapes, cuboid shapes, spiral shapes, cylindrical shapes, square shapes, bullet shapes, cone shapes and parallelepiped shapes, among others not listed herein, may easily be manufactured according to the apparatus and methods disclosed herein.

Illustrative embodiments have been described herein and it will be apparent to those skilled in the art that the above apparatus and methods may incorporate changes and modifications without departing from the general scope of the disclosed invention. It is intended to include all such changes and modifications within the scope of the present invention.

I claim:

1. An apparatus for producing substantially clear ice, comprising:
    an insulated ice mold including one or more cells with insulated sidewalls and each cell having an open top and an open bottom;
    an insulated container having an open top providing for the placement of the insulated ice mold into, and in substantial contact with, the insulated container wherein the insulated ice mold is positioned and supported substantially above the bottom of the insulated container forming a liquid water reservoir below the ice mold,
    wherein a first surface area/volume ratio (SA/V) of a liquid contained in the insulated ice mold is greater than a second surface area/volume ratio (SA/V) of the liquid residing in the liquid water reservoir, which acts to substantially reduce the rate of freezing near an ice-water reservoir contact point and thereby arresting the formation of ice in the liquid water reservoir.

2. The apparatus of claim 1 wherein the ice mold and one or more sidewalls of one or more adjoining cells are formed from a thermally insulating material.

3. The apparatus of claim 1 wherein the ice mold is substantially impermeable to water.

4. The apparatus of claim 1 wherein the insulated container is lined with a thermally insulating material and the insulated container is substantially impermeable to water.

5. The apparatus of claim 1 wherein the ice mold is formed from a material selected from the group consisting of silicone, plastic, thermoplastic, polyethylene, polypropylene, polyurethane foam, beaded polystyrene foam, expanded polystyrene foam or low thermal conductivity material.

* * * * *